US008642945B2

(12) United States Patent
Kern et al.

(10) Patent No.: US 8,642,945 B2
(45) Date of Patent: Feb. 4, 2014

(54) ARRANGEMENT FOR A REMOVABLE ION-OPTICAL ASSEMBLY IN A MASS SPECTROMETER

(75) Inventors: Ewgenij Kern, Oldenburg (DE); Jens Rebettge, Schwanewede (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 13/567,213

(22) Filed: Aug. 6, 2012

(65) Prior Publication Data

US 2013/0032708 A1 Feb. 7, 2013

(30) Foreign Application Priority Data

Aug. 4, 2011 (DE) ........................ 10 2011 109 397

(51) Int. Cl.
*B01D 59/44* (2006.01)
*H01J 49/00* (2006.01)

(52) U.S. Cl.
USPC ........... 250/281; 250/282; 250/283; 250/287; 250/288; 250/289; 250/290; 250/291; 250/292

(58) Field of Classification Search
USPC ................................ 250/281–283, 287–292
See application file for complete search history.

(56) References Cited

U.S. PATENT DOCUMENTS

| | | | | |
|---|---|---|---|---|
| 2,583,121 | A | 1/1952 | Reynolds | |
| 3,886,358 | A | 5/1975 | McLaughlin et al. | |
| 4,745,277 | A | 5/1988 | Banar et al. | |
| 4,994,676 | A | 2/1991 | Mount | |
| 6,797,948 | B1 | 9/2004 | Wang | |
| 7,601,951 | B1 * | 10/2009 | Whitehouse et al. | 250/289 |
| 7,667,193 | B2 * | 2/2010 | Finlay | 250/281 |
| 2004/0163673 | A1 | 8/2004 | Holle et al. | |
| 2006/0097147 | A1 * | 5/2006 | Anderson et al. | 250/287 |
| 2009/0242747 | A1 | 10/2009 | Guckenberger et al. | |

FOREIGN PATENT DOCUMENTS

DE 102008008634 9/2009

OTHER PUBLICATIONS

Girard et al., "Determination of Quadrupole Charging in MS/MS Instruments", Journal of Chromatographic Science, vol. 48, Oct. 2010, pp. 778-779.
Busch, "Ion Burn and the Dirt of Mass Spectrometry", Sep. 2010, www.spectroscopyonline.com.
Thorlabs, Inc. Catalog, 2004.

* cited by examiner

*Primary Examiner* — Jack Berman
*Assistant Examiner* — Meenakshi Sahu
(74) *Attorney, Agent, or Firm* — O'Shea Getz P.C.

(57) ABSTRACT

A device for use in a mass spectrometer allows an ion-optical assembly to be removed, cleaned and reinserted with relatively high positioning accuracy. In particular, the device obviates the need for complex adjustments requiring special knowledge after the reinsertion. The objective is achieved by an arrangement comprising a receptacle and a mount for a removable ion-optical assembly in a mass spectrometer. Favorable implementations provide a mount and a receptacle with three pairs of complementary support elements, the three support elements on the receptacle form a support plane, and, when the mount is inserted into the receptacle, at least two pairs of support elements are engaged and the mount is aligned with respect to the support plane with the aid of the third pair of support elements.

20 Claims, 8 Drawing Sheets

Figure 13A
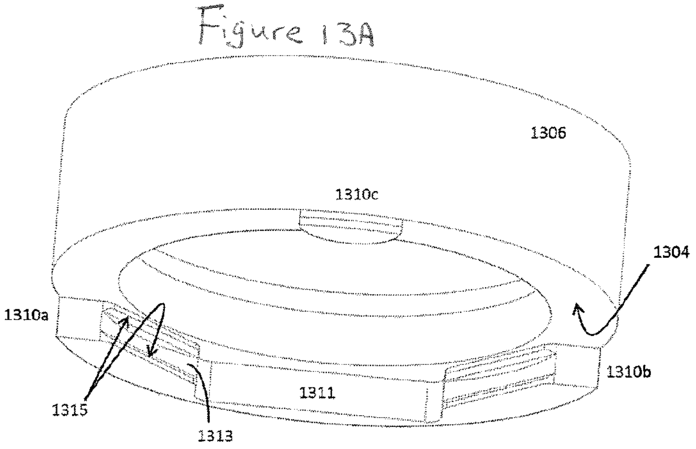
Figure 13B
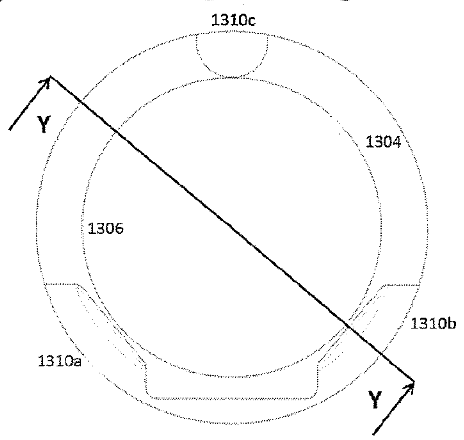
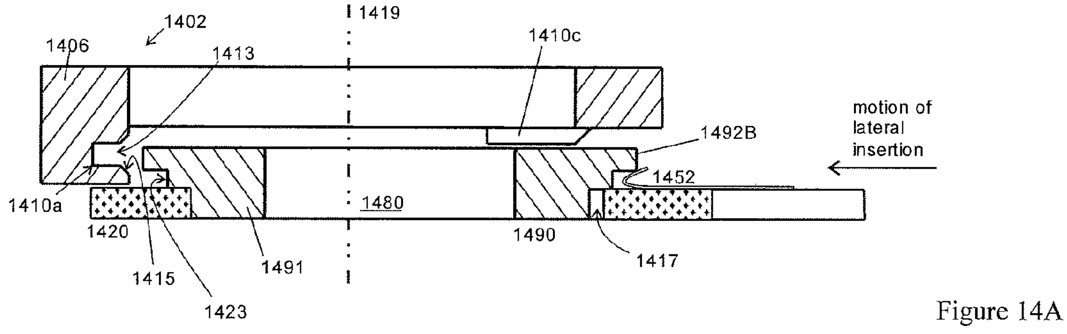
Figure 14A

ARRANGEMENT FOR A REMOVABLE ION-OPTICAL ASSEMBLY IN A MASS SPECTROMETER

PRIORITY INFORMATION

This patent application claims priority from German Patent Application 10 2011 109 397.8 filed on Aug. 4, 2011, which is hereby incorporated by reference.

FIELD OF THE INVENTION

The invention relates to an arrangement comprising a receptacle and a mount for a removable ion-optical assembly in a mass spectrometer, and a mass spectrometer with a corresponding arrangement.

BACKGROUND OF THE INVENTION

The performance of a mass spectrometer can be reduced by contamination of its components, such as ion sources. During operation of a MALDI desorption ion source, for example, a sometimes visible coating of organic material can build up on the electrodes. In the prior art, such coatings on ion-optical devices in mass spectrometers are described by Girard et al. in the Journal of Chromatography Science, 2010 October, 48 (9), 778-779, and in the article by Kenneth L. Busch entitled "Ion Burn and the Dirt of Mass Spectrometry", online publication, Sep. 1, 2010. The insulating organic coating becomes charged when the ion source is in operation and thus generates an electrical interference field which is superimposed onto the desired electric field between the electrodes and the MALDI sample support when the desorption ion source is in operation. This interferes with the acceleration process. Field changes, in particular, interfere with the focusing properties of the accelerating electrodes. Consequently, the ion beam is no longer focused accurately onto the detector.

A noticeable effect of such a coating can be a decrease in ion throughput to the mass analyzer connected to the ion source. The reduced ion throughput in turn requires the additional acquisition and summation of spectra in order to maintain a specific quality level for the mass spectra. The reduction in the ion throughput also limits the number of analyses which are possible per sample, and reduces the detection limit of the mass spectrometer.

Girard et al. describe a method whereby a simple reversal of the polarity of the ion source, which changes the polarity of the ions to be analyzed, can neutralize the charging effect. Since a MALDI method generates ions of both polarities, the polarity of the accelerating field would therefore have to be reversed for the analogous application of the method according to Girard et al. However, this method only addresses the symptoms of the loss of throughput in the ion source, and promises only a short-term effect.

Irrespective of the short-term solution mentioned above, there is therefore regularly a need to remove the coating and thus restore the performance of the mass spectrometer. Sometimes, if the cleaning is not able to restore something approaching the ideal state of an ion-optical device, it must be replaced by a new, clean one. Ion-optical devices can be taken to include all of the elements of a mass spectrometer and/or of an ion source on which deposits can form, for example, accelerating and/or ground electrodes of an ion source, and also injection capillaries, multipole rod systems, ion funnels comprising ring electrodes, ion deflectors (condensers) and similar.

Cleaning methods are known in the prior art with which the contamination can be at least partially removed. U.S. patent application U.S. 2004/0163673 A1 (Holle et al.) describes a sample support dummy with bristles, for example, which can remove interfering coatings by "scrubbing", and a spray cleaning device which utilizes the low pressure in the vacuum chamber of the ion source in order to direct a jet of solvent onto the accelerating electrodes and to dissolve and remove deposits by its impact. German patent application DE 10 2008 008 634 A1 (Holle et al.) discloses a method where the coating is removed by local heating.

A further method for removing the coating, which is still used in practice, is to clean the electrodes manually after venting and opening the mass spectrometer. The cleaning is usually carried out with solvents such as ethanol or acetone, but when the contaminations are stubborn the electrodes can also be abraded with cleaners containing abrasive agents (including toothpaste, for example). Since the confined space makes it difficult to clean the ion-optical assembly while it is inside the mass spectrometer, and the aim is to avoid contaminating neighboring components with the dirt removed during the cleaning process, the ion-optical assembly is usually uninstalled. If the mass spectrometer is vented during the disassembly, it often takes some hours until the necessary operating vacuum is restored after the ion-optical assembly has been cleaned and re-inserted.

The removal and cleaning themselves are usually steps which can be carried out in a straightforward manner They require a certain degree of experience, but no special knowledge. These steps can thus also be carried out without any major difficulty by members of staff who have been given appropriate instruction. It becomes difficult, however, when the removed parts have to be reinserted in their position in the mass spectrometer. The necessary use of electromagnetic forces and fields to control and manipulate ions means that the ion-optical devices have to be positioned within narrow tolerances. These tolerances should be no larger than a few tens of micrometers. For example, the separation, perpendicular to the surface, between a MALDI sample support with sample applied to it and the first accelerating electrode essentially determines the acceleration path of ions on their way to the mass analyzer, and thus the kinetic energy they accumulate along the path. The control and correct adjustment of this kinetic energy is decisive for the operation of a time-of-flight mass spectrometer. Deviations of the separation, perpendicular to the surface, between the sample and the accelerating electrode (also indirectly via a lateral offset/shift) can therefore have a significant negative influence on a mass spectrometric analysis.

In addition, ion-optical devices have to be supplied with voltages. This means that electrical supply lines, which at present usually have screw connections, must be detached during removal of the ion-optical assembly and reconnected during reinstallation, which requires additional manual measures.

For this reason, specially trained staff from the manufacturer or its appointed dealers are often required to reinstall an ion-optical assembly which has been removed for cleaning. This may involve realigning the reinstalled ion-optical assembly in the mass spectrometer in order to ensure that it is reinserted with high positioning accuracy. If there are no alignment marks or similar in the mass spectrometer, it is often not just that the ion-optical assembly must be realigned with respect to the mass spectrometer. It may also be necessary to realign other components of the mass spectrometer, such as a reflector or a detector (in two planes), not to mention additional fine tuning of the supply voltages. The man-hours required for such maintenance work are considerable, and also costly for the user of the mass spectrometer, who must pay the travel expenses of the specialist personnel, for example.

U.S. patent application U.S. 2009/0242747 A1 (Guckenberger et al.) discloses a mass spectrometer in which an ion source and various ion-optical elements are integrated in a sub-unit. The sub-unit is removed from the mass spectrometer in order to clean away the contamination that builds up during operation, and reinserted, whilst maintaining the vacuum.

U.S. Pat. No. 7,601,951 B1 (Whitehouse et al.) describes an atmospheric pressure ion source which is designed so that all or some of the vacuum components, such as ion-focusing and ion-transporting electrostatic lenses and ion guides and two or more vacuum stages integrated into a unit are removed from an ion source or vacuum housing U.S. Pat. No. 7,667,193 B2 (Finlay) discloses a mass spectrometer with modular design in order to provide a user with an appropriately personalized analytical device by inserting a personalized analytical module. High positioning accuracy when reinserting the modular components is assumed in all three documents, largely without providing design details U.S. Pat. No. 6,797,948 B1 (Wang) and U.S. Pat. No. 4,745,277 A (Banar et al.) disclose assembly plans for a multipole rod set and a heated filament ion source in a mass spectrometer, respectively, in more detail.

At the beginning, MALDI ion sources were referred to specifically. The invention to be presented below should not, however, be limited to special types of generation or guidance of ions in a mass spectrometer. Similar considerations can also be made for electrospray ion sources, electron impact ion sources, ion sources with chemical ionization, and others.

There is a need to provide a device for use in a mass spectrometer which allows an ion-optical device or assembly to be removed, cleaned and reinserted with high positioning accuracy without the need for special knowledge. In particular, the device should obviate the need for complex adjustments requiring special knowledge after the reinsertion.

SUMMARY OF THE INVENTION

According to an aspect of the invention an arrangement comprising a receptacle and a complementary mount for a removable ion-optical assembly in a mass spectrometer is provided. The mount and the receptacle have three pairs of complementary support elements; the three support elements on the receptacle form a support plane, and, when the mount is inserted into the receptacle, at least two pairs of support elements are engaged and the mount is aligned with respect to the support plane with the aid of the third pair of support elements.

The small spatial size of the points via which the support elements engage with each other, by a simple small contact area, for example, facilitates the removal and reinsertion of the mount into the receptacle, particularly because of the low friction resistances. The small number of contact points, furthermore, makes it possible to satisfy the high demands in terms of reducing material abrasion in a vacuum environment, which can be caused by a relative motion of two touching surfaces.

The paired interaction of two support elements on the mount and the receptacle respectively forms two stabilization points. The mount can then be rotated, within a predetermined angular range, about an axis which passes through the two pairs of support elements which are engaged with each other. It is preferable if the predetermined angular range is determined by the orthogonal separation between the axis and the third pair of support elements.

In one embodiment, the third pair of support elements has contact areas opposite each other. It can thus limit the predetermined angular range in one rotational direction, for example.

In a further embodiment, the receptacle is cylindrical. A cylindrical design makes it relatively easy to define an axis of the receptacle which can coincide with an ion path. The three support elements of the receptacle are preferably arranged in the region of one end face of the cylinder. The term ‘cylindrical’ is not to be construed restrictively as “circular cylindrical”. Various shapes and forms of cylinders, be they rotationally symmetric or asymmetric, can be adequate for the intended purpose.

In a further embodiment, two of the support elements on the receptacle are recessed, and the complementary support elements on the mount have a bulged configuration; they can, for example, protrude in the shape of a dome. A milled hemispherical contour can be used, for example. Alternatively, a metal sphere can be partially recessed on the mount.

In a further embodiment, the mount and the receptacle can be interlocked with each other. A disengaging and re-engaging locking mechanism is preferably arranged on the third pair of support elements and ensures that a holding force is applied to the third pair of support elements. The third pair of support elements can, for example, have a tapered contact head on the receptacle and a pre-tensioned catch on the mount. It is also possible for the engagement of the holding force and the alignment to the support plane to be separate. To this end, the third pair of support elements can have a partially recessed sphere at one end of the receptacle and a counter-surface on the mount for the alignment; and adjacent to this, the locking mechanism can comprise a tapered contact head on the receptacle and a pre-tensioned catch on the mount.

In a further embodiment, the mount has a ring and a radially projecting handle. The dimensions of the ring are preferably matched to the dimensions of the cylinder.

In a further embodiment, the ion-optical assembly is supported on the mount, for example by an adhesive or mechanical connection (such as for example screws, clips, frictional connection, positive engagement or similar).

In a further embodiment, the mount can be removed and reinserted in a plane roughly perpendicular to an axis of the receptacle, which may coincide with an ion path or an ion path axis in the mass spectrometer.

The mount preferably features electrodes, or is configured to accept electrodes, as are required for an ion source of matrix-assisted laser desorption and ionization. These electrodes, in particular accelerating and/or ground electrodes, can be fastened (detachably) on the mount with the aid of insulating parts. If the mount is made of a non-conducting material, the insulating parts can be omitted.

The invention also overcomes the above-mentioned problems with the aid of a mass spectrometer with an arrangement as described above. A lock for introducing and extracting the mount without breaking the vacuum is preferably provided. With a MALDI ion source, a lock can be provided with a double function, which is designed for introducing and extracting the MALDI sample mounts and also introducing and extracting the removable ion-optical assembly, in this case a part of the ion source (screening, accelerating and ground electrodes).

In a further embodiment, sprung contact pins are supported on the receptacle and serve to touch appropriate counter-contacts, which are supported on the mount, in order to create an electrical connection when the mount is inserted into the receptacle.

In a second aspect, the invention presents an arrangement for a mass spectrometer that comprises a receptacle, a mount and an ion-optical assembly member. The mount and the ion-optical assembly member are configured such that the ion-optical assembly member can floatingly engage with the mount. The receptacle, the mount, and the ion-optical assembly member are further configured such that, upon insertion of the ion-optical assembly member into the receptacle with the aid of the mount, the ion-optical assembly member becomes at least partially disengaged from the mount and aligned towards the receptacle in at least one dimension.

In various embodiments, partial disengagement comprises releasing direct physical contact and maintaining pre-tension contact through a sprung member interposed between the mount and the ion-optical assembly member. A sprung member for exerting the pre-tension is mentioned in this context by way of example only. Pre-tension may also be created by actuators, such as for example stepper motors, for instance, which do not necessarily provide a restoring force Skilled workers in the field will find many alternatives with which to exert pre-tension on the ion-optical assembly member.

In further embodiments, the mount has an inner aperture, and the ion-optical assembly member comprises a body which is slightly undersized to fit into the inner aperture. This allows easy insertion of the ion-optical assembly member into the mount. The ion-optical assembly member may further comprise a flange portion protruding from the body as to contact a rim region of the inner aperture when engaging therewith.

In some embodiments, the flange portion is doubly stepped as to provide alignment surfaces for contacting corresponding counter-surfaces at the receptacle. Such design allows for accurate alignment of the ion-optical assembly member in relation to the receptacle without suffering from any mechanical tolerance at interfaces with the mount. The counter-surfaces may be located at a groove portion of the receptacle. Preferably, the groove portion has a beveled entrance to facilitate insertion of the counterpart at the ion-optical assembly member and to assist in the disengaging step.

In various embodiments, a direction of insertion and withdrawal is approximately perpendicular to an axis of the receptacle, which preferably coincides with an ion path (axis) in a mass spectrometer. Such direction generally represents the shortest way of withdrawing something from a mass spectrometer thereby facilitating compact construction of the whole assembly.

These and other objects, features and advantages of the present invention will become more apparent in light of the following detailed description of preferred embodiments thereof, as illustrated in the accompanying Figures.

BRIEF DESCRIPTION OF THE DRAWING

In the following, the invention is described with the aid of example embodiments in conjunction with the attached drawings. The drawings illustrate the fundamentals of the invention and are often schematic in nature. The drawing shows:

FIGS. 13A and 13B illustrate a receptacle configured to interact with the ion-optical assembly member from FIG. 12;

FIGS. 14A-14C illustrate a method of inserting an ion-optical assembly into a receptacle with the aid of a mount in three steps.

DETAILED DESCRIPTION OF THE INVENTION

Figure 1:
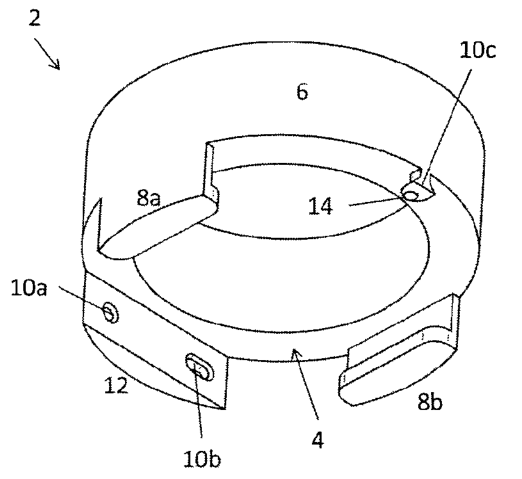
FIG. 1 illustrates an example of a receptacle according to an aspect of the invention.

FIG. 1 shows an embodiment of a receptacle 2. The receptacle 2 has a cylindrical basic structure. On one end 4 of the cylinder 6, two angled elements 8*a*, 8*b* are arranged diametrically opposite each other in this example and serve as guide elements for the mount, which will be described in connection with another illustration. Roughly along a line which is at right angles to the line connecting the angled elements 8*a*, 8*b*, there are three support elements 10*a*, 10*b*, 10*c*, which are approximately diametrically opposite each other on the end 4 of the cylinder 6. The three support elements 10*a*, 10*b*, 10*c* define a support plane, onto which a mount is aligned with the receptacle 2 when inserted.

One support element 10*a* is formed by a sunken hole; another support element 10*b* by a recessed pocket in a shoulder piece 12 arranged on the end face 4 so as to be open toward the cylinder axis. The cylinder axis (not shown) can preferably correspond to an ion path when used in the operation of the mass spectrometer. The chamfers of the sunken hole and the pocket are oriented toward the cylinder axis and serve to center and spatially fix a mating counterpart (on the mount) when it is inserted. The pocket partially extends in the direction of the circumference in order to allow the insertion of an appropriate counterpart.

A third support element 10*c* includes a contact head located on the end face 4, with a neck (or holding rib) which is tapered in sections toward the shown end 4 of the cylinder 6. The end of the contact head pointing away from the end face 4 is flat, and here has a dome 14 to provide as small a contact area as possible. The dome 14 is preferably spherically rounded toward the outside in order to allow a small, especially tangential, contact area.

The dome 14 can take the form of an added disk or a sphere partially recessed in the flat surface, whose curvature means that it provides a relatively small contact area. Certain embodiments also comprise a contact area 18, facing away from the end 4 of cylinder 6, on a partially recessed sphere 16, and a separate head 10*c (without dome), which can be a part of a locking mechanism to be described further below. A corresponding embodiment can be seen in FIG. 1A in a partial cross-section. Nickel-plated aluminum is preferably used as the material for the receptacle 2**.

Figure 2:
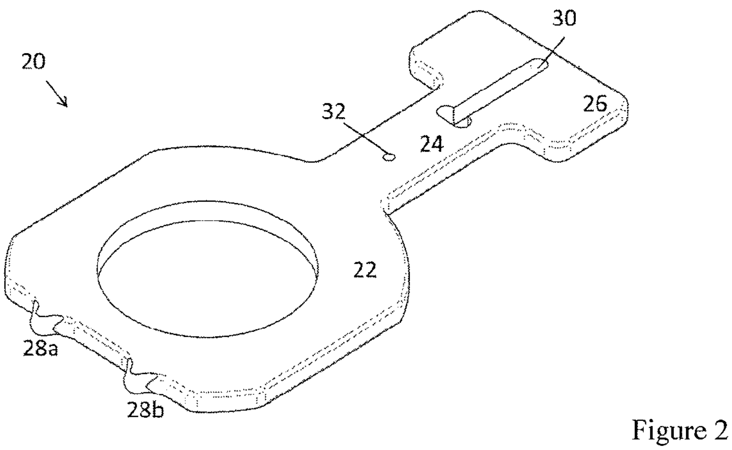
FIG. 2 illustrates an example of a mount according to an aspect of the invention.

FIG. 2 shows an embodiment of a mount 20 which has a form that is complementary to the receptacle 2 shown in FIG. 1. The mount 20 is also preferably made from nickel-plated aluminum The mount 20 has a flat ring 22 with a radially projecting handle 24, which in turn has a flat end plate 26. The ring 22 has an inside diameter which is preferably matched to the inside diameter of cylinder 6 of the receptacle 2. The external circumference of ring 22 also agrees in an advantageous way with the external circumference of cylinder 6 (with a slight undersize) in order to fit into the space between the angled elements 8*a*, 8*b* of the receptacle 2, for example. The available contact area of the ring 22 can be formed in such a way that it approximately matches the end 4 of the cylinder 6 of the receptacle 2. The elements to be carried, an ion-optical assembly, for example, are preferably supported on the ring 22, jointed, bonded or otherwise mechanically anchored. It is advantageous if the ion-optical assembly is connected to the mount 20 in such a way that it can be detached and reconnected (i.e., the mount is removable and replaceable), for example by a clamping mechanism.

Two complementary support elements 28*a* and 28*b*, which in this example have the form of two protrusions, are located on the narrow outer edge of the ring 22, at the end which is approximately diametrically opposite the handle 24. These protrusions can be the result of milling off the originally larger dimensioned ring 22 (milling contour). The protrusions may have a rounded contour and can therefore easily engage in the chamfered recesses (sunken hole and pocket) on the receptacle 2. The spacing of the protrusions on the narrow outer edge of the ring 22 corresponds to the spacing of the recesses on the shoulder piece 12 of the receptacle 2. The elongated design of the pocket allows tolerances resulting from the manufacturing process or temperature-dependent material movements to be accommodated.

At the distal end of the handle 24, in the example shown mainly in the flat end plate 26, there is a T-shaped elongated hole 30, the main part of which extends along the longitudinal axis of handle 24. This elongated hole 30 serves to accept a compression spring described in connection with a locking mechanism, which can lock together the third support element 10*c* and a matching complementary element, with the aid of a further illustration. A drill hole 32 is located at the proximal end of the handle 24 to accept a guide pin, which is also part of the aforementioned locking mechanism. The drill hole 32 can take the form of a tapped hole, for example, into which a screw is inserted. The threaded body of the screw can then assume the guiding function of the pin.

The ring 22 of the mount 20 shown in the example is particularly suitable for mounting an ion-optical assembly. If the ion-optical assembly is a first accelerating electrode and/or a ground electrode, for example, as explained at the beginning in connection with a MALDI ion source, these are preferably arranged concentrically with the ring opening in order to ensure that the accelerated ions pass without hindrance on the ion path. An electrode can be located in the plane of the ring 22. But it can also be displaced axially in order to space it from the plane of the ring. Such an arrangement also allows several electrodes or ion-optical devices to be connected to the ring 22.

Figure 3A:
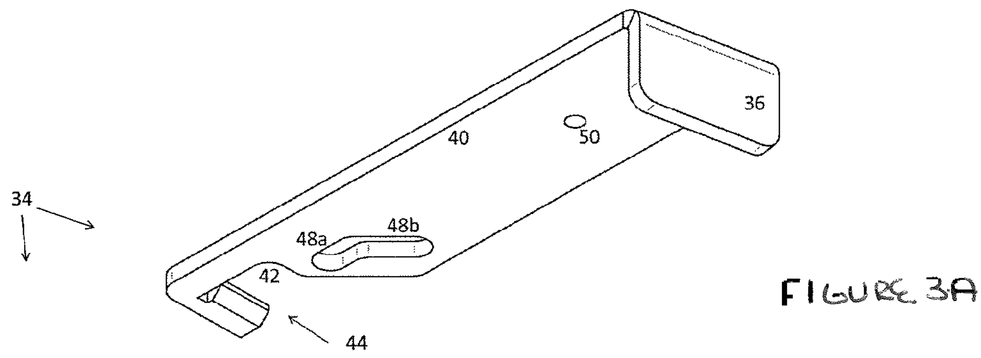
FIGS. 3A and 3B illustrate a catch for a locking mechanism.
Figure 3B:
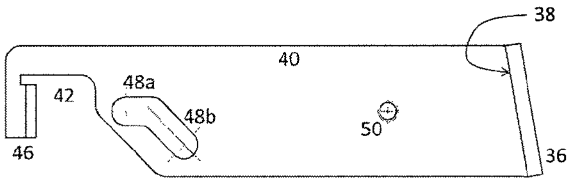

FIGS. 3A and 3B illustrate a catch 34 in two different views as part of a locking mechanism, which here represents the complementary element matched to the third support element 10*e*, and simultaneously makes locking possible. The catch 34 includes an angular structure, where an angled end 36 is provided for manual operation of the locking mechanism. In this example, the edge of the angled end 38 does not run perpendicular to the longitudinal direction of the catch 34, but slants slightly. The reason for this form becomes clear in connection with illustrations to be described further below. The elongated end 40 has a lateral notch 42 at its distal end, which creates a kind of bow 44. In this example, the bow 44 has a slightly undercut lateral section 46, which is chamfered as a contact area on the side pointing inwards into the bow. Between the edge of the angled end 38 and the bow 44, the catch has a guide slot 48, which is provided to accept the guide pin. The guide slot 48 is divided into two guide sections 48*a* and 48*b*, which have different angles with respect to the longitudinal axis of the catch 34. The first guide section 48*a* runs essentially parallel to the longitudinal axis; the second guide section 48*b* is at a slight angle to it. A drill hole 50 is provided toward the proximal end of the catch 34, with which the catch 34 can be connected to the mount 20 via a spring element so as to be movable, for example by a bolt and lock-nut.

Figure 4:
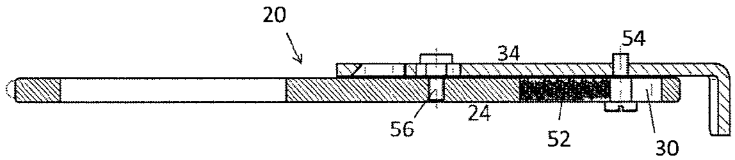
FIG. 4 illustrates a cross-sectional view of a mount according to an aspect of the invention with catch.
Figure 5:
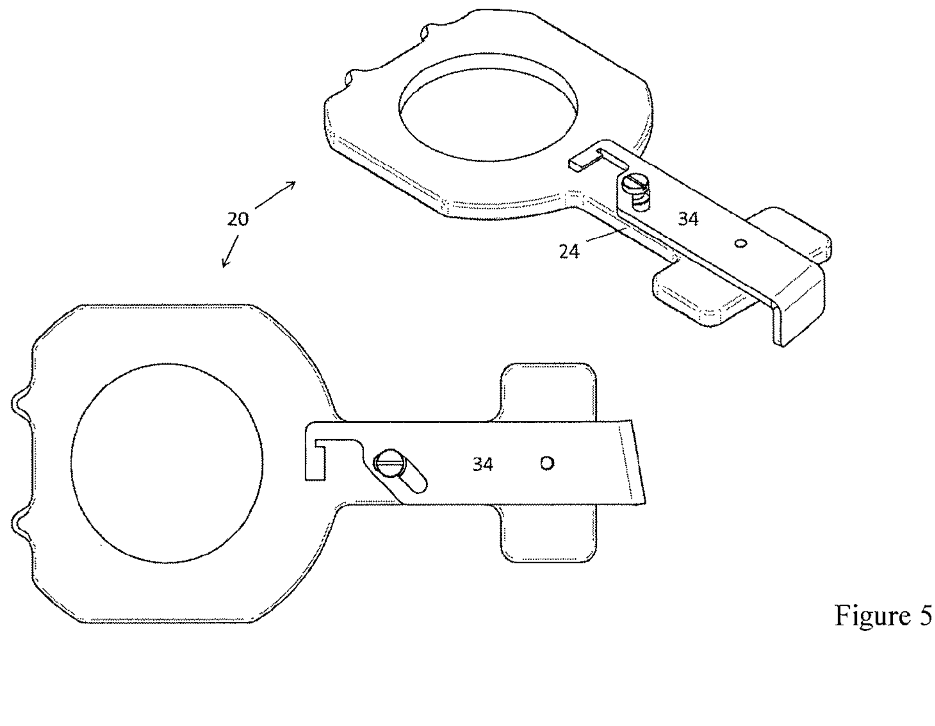
FIG. 5 illustrates a side view of the mount with catch from FIG. 4.
Figure 6:
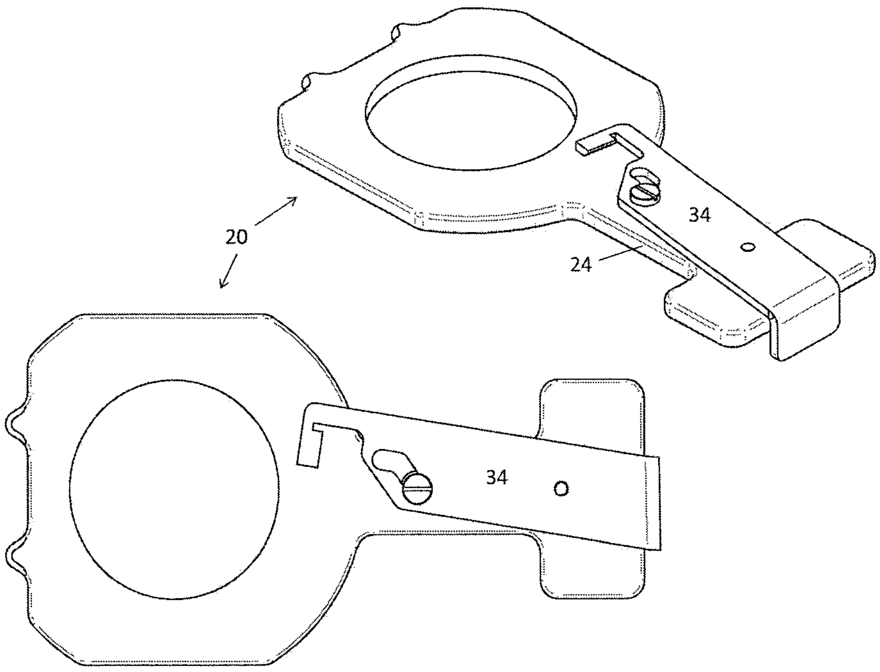
FIG. 6 illustrates a further side view of the mount with catch from FIG. 4.

FIGS. 4 to 6 show different views of the catch 34 connected to the mount 20. A compression spring 52 is located in the elongated hole 30 with one end in contact with the interior wall of the mount 20, and the other end in contact with a fastening device such as a screw 54. The compression spring 52 is fastened to the catch 34 for example by the screw 54. The elongated hole 30 can have a thin wall on one side of the mount 20 (at the bottom in the illustration) which extends over part of the longitudinal extension of the elongated hole 30, supports the guiding of the compression spring 52 in the elongated hole 30, and thus prevents the compression spring 52 bulging out of the plane of the mount 20 on one side. Bulging to the other, open side of the elongated hole 30 is prevented by the body of the catch 34 itself. The compression spring 52 generates a pre-tensioning or bias of the catch 34 in the direction of the distal end of the handle 24, i.e., a position in which the guide pin 56 in the distal end of the guide slot abuts in the first guide section 48*a*; depending on the state of tension of the spring 52, abutment in the sense of actual contact is not strictly necessary, however. In this state, the catch 34 and the handle 24 of the mount 20 are approximately congruent in the example shown (see FIG. 5).

If the catch 34 is now operated, for example by pressing the angled end 36 radially inwards (see FIG. 6), the compression spring 52 is compressed and the slot 48 moves along the fixed guide pin 56 until the second guide section 48*b* makes contact with it. The catch is deflected sideways by the change of direction in the second guide section 48*b*. From this view it becomes clear why the edge of the angled end 38 of the catch 34 slants slightly with respect to the longitudinal axis of the catch 34. The angle of slant is adapted to the angle between the two guide sections 48*a*, 48*b* of the catch 34 so that the angled end 36 can make flush contact at the distal narrow edge of the end plate 26 in this state. By releasing the compression spring 52, the guide pin 56 moves in the guide slot 48 in the opposite direction so that the catch 34 moves back into its position, partially covering the handle 24 of the mount 20.

Figure 7:
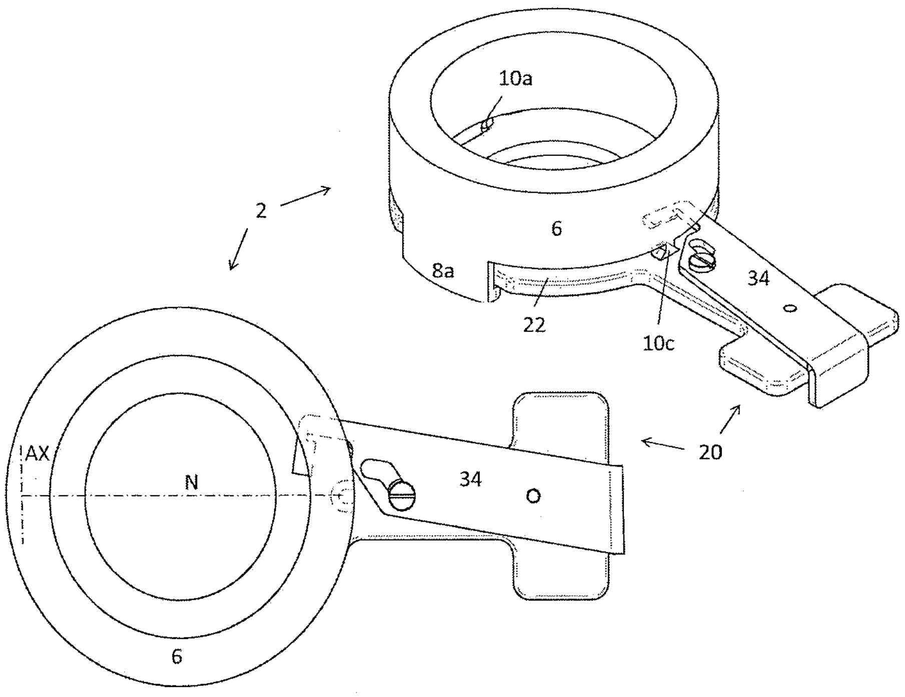
FIG. 7 illustrates how a mount according to an aspect of the invention is held in a receptacle.

FIG. 7 shows how the mount 20 is held in the receptacle 2, for example as a consequence of a lateral insertion movement. The third support element 10*c* and the corresponding complementary element are not yet engaging, however, because the catch 34 is still in the deflected position, as is shown. The angled elements 8*a*, 8*b* on the end 4 of the receptacle 2 provide a guiding surface for the ring 22 of the mount 20 for correct positioning when the mount 20 is inserted into the receptacle 2. The two protrusions 28*a*, 28*b* can thus be introduced into the recesses provided (sunken hole 10*a* and pocket 10*b*) by a relatively simple forward movement of the mount 20. There they are centered and spatially fixed. If the cylinder axis aligns with the direction of an ion path, the lateral forward movement corresponds to a lateral introduction or insertion movement, i.e. perpendicular to the ion path or an ion-optical axis.

In the state depicted in FIG. 7, the mount 20 can be rotated through a predetermined angular range about an axis AX running through the two protrusions 28*a*, 28*b* or recesses 10*a*, 10*b*. This angular range is essentially determined by the perpendicular distance N of the third support element 10*c* from the axis AX which passes through the recesses 10*a*, 10*b*. The larger the distance, the smaller the angular range available becomes. Further elements limiting the rotary movement are, for example, the angled elements 8*a*, 8*b* on the end 4 of the cylinder 6, or in the other direction the third support element (contact head 10*c*, for example). Here, the accessible angular interval is only a few degrees.

Figure 8:
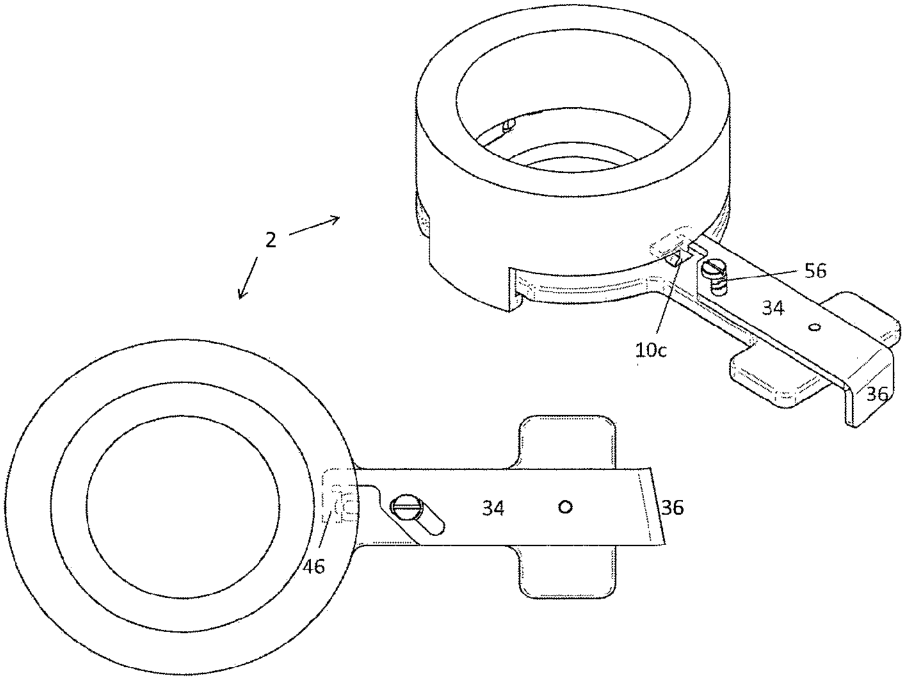
FIG. 8 illustrates the mount and receptacle from FIG. 7 with rotated catch.

If the pressure on the angled catch end 36 is removed, this causes a release movement of the compression spring 52, which means that the slot 48 is guided along the guide pin 56 until the guide pin 56 again takes up its position at the distal end of the first guide section 48*a*. The catch 34 therefore rotates back from its deflection, and the lateral section 46 of the bow comes to rest on the tapered section (neck) of the contact head 10*c*, as shown in FIG. 8. This pressurized contact means that the contact head 10*c* and the lateral section 46 of the bow are engaged with each other and prevent any further movement of the mount 20 relative to the receptacle 2. Thus the position of the mount 20 relative to the receptacle 2 is fixed spatially, and particularly in a reproducible way (with a positioning accuracy of a few micrometers), with the aid of three stabilization points which form a support plane.

Figure 1A:
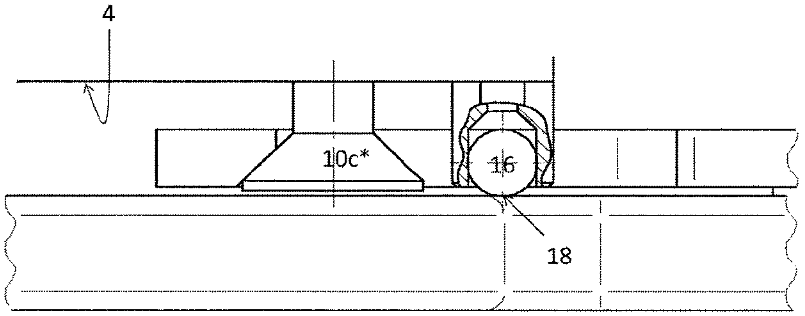
FIG. 1A illustrates a modification of the receptacle from FIG. 1 in an enlarged partial view.

It is preferable if the contact head 10*c* projects axially from the end face 4 of the receptacle 2 so far that a proximal segment of the handle 24 is also in, preferably punctiform, contact with the dome 14 on the bottom of the contact head 10*c*. However, it is also possible to select an arrangement with a partially recessed sphere 16, as is shown in FIG. 1A, which means that the point where force is applied (pressurized contact of the bow on the contact head) and the location of the alignment (contact between sphere and handle as third point of the support plane) are separate from each other.

In the example shown, the three pairs of support elements represent the only points at which the mount 20 comes into contact with the receptacle 2. The small number of contact points means that relatively high positioning accuracy can be achieved in a reproducible way, i.e. after repeated removal and reinsertion of the mount 20. The force application between catch bow and contact head ensures that positional tolerances are reduced.

In order to remove the mount 20 from the receptacle 2 again, for example in order to expose an ion-optical assembly attached to the mount 20 and, where necessary, to clean it in an ultrasonic bath, the above-mentioned steps can simply be run through in reverse order, i.e.: press the angled catch end 36 to deflect the catch 34 and disengage the locking between the lateral section 46 of the bow and the contact head 10*c*; and laterally extract the mount 20 from the receptacle 2.

Figure 9:
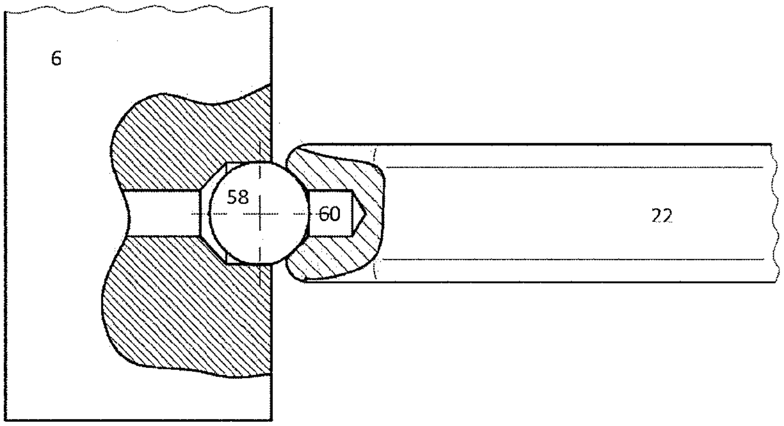
FIG. 9 illustrates a detail view of the engagement between an embodiment of a support element and the corresponding complementary element.

The invention is described here mainly with the aid of the example embodiment shown in the illustrations. Modifications of this embodiment are easily possible, however, and those skilled in the art can carry them out with knowledge of the inventive principle without leaving the scope of the present invention. For example, it is possible to form the first two support elements 10*a*, 10*b* so that they protrude in the faun of a dome, whereas the corresponding complementary support elements 28*a*, 28*b* then have the form of sunken holes (or pockets) on the narrow edge of the carrier ring 22 (see FIG. 9 with partial cross-section, where the dome is a sphere 58 partially recessed in the material of the receptacle 2). It is also possible to have a mixed design, where one dome and one sunken hole 60 are provided on both the mount 20 and the receptacle 2.

Furthermore, a compression spring is used to generate a pre-tension or bias. It is understood, however, other mechanisms can also be used to generate a pre-tension, for example a block of elastic material, an extension spring or a magnet with appropriate design adaptations. In certain embodiments, an actuator for providing pre-tension may be foreseen.

Figure 10:
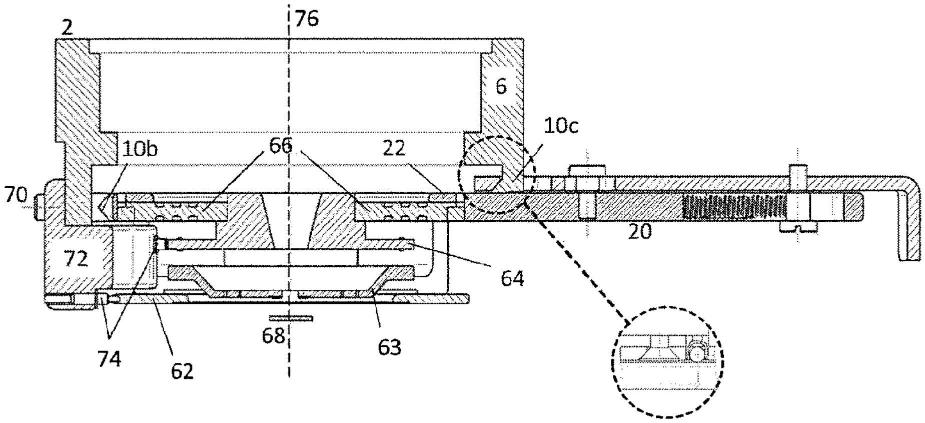
FIG. 10 illustrates an arrangement according to an aspect of the invention with an ion-optical assembly.

FIG. 10 shows a further example embodiment of an arrangement according to principles of the invention. The mount 20 is inserted here into the receptacle 2, and the three support elements 10*a*, 10*b*, 10*c* and corresponding complementary support elements are engaged with each other. In this example, three electrodes 62, 63, 64 are attached to the mount 20, and connected with the ring 22 via electrical insulation pieces 66. The electrode 62 can be a screening electrode, electrode 63 an accelerating electrode, and electrode 64 a ground electrode of a MALDI ion source, for example. Their arrangement means the electrodes 62, 63, 64 extend to one side from the plane of the mount 20 so that the mount 20 equipped in this way can nevertheless be inserted into the receptacle 2 without being obstructed by the cylinder 6. The alternative alignment and locking device, in accordance with FIG. 1A, is indicated in the dashed circle.

The receptacle 2 also has an extension 72 supported by a screw connection 70. This extension projects beyond the end face 4 of cylinder 6 and is equipped with sprung contact pins 74, which are accessible in the radially inward direction in relation to the cylinder axis 76. The purpose of the contact pins 74, which are preferably manufactured from a material which is a good electrical conductor, such as gold-plated beryllium copper, is to create the electrical connection of the electrodes 62 63, 64 to the power supply/supplies when the mount 20 is inserted into the receptacle 2. For this purpose, the contact pins 74 (along the cylinder axis) are at the same level as the contact counterparts which are correspondingly provided on the electrode holder; and when the mount 20 with the connected electrodes 62, 63, 64 in this example is inserted from the side, the pins are touched by the radial narrow side of the contact counterparts and pushed in slightly so that the electrical contact can be reliably created. In the representation shown, the contact pin which contacts the center electrode 63 is outside the area represented and therefore cannot be seen.

Figure 11:
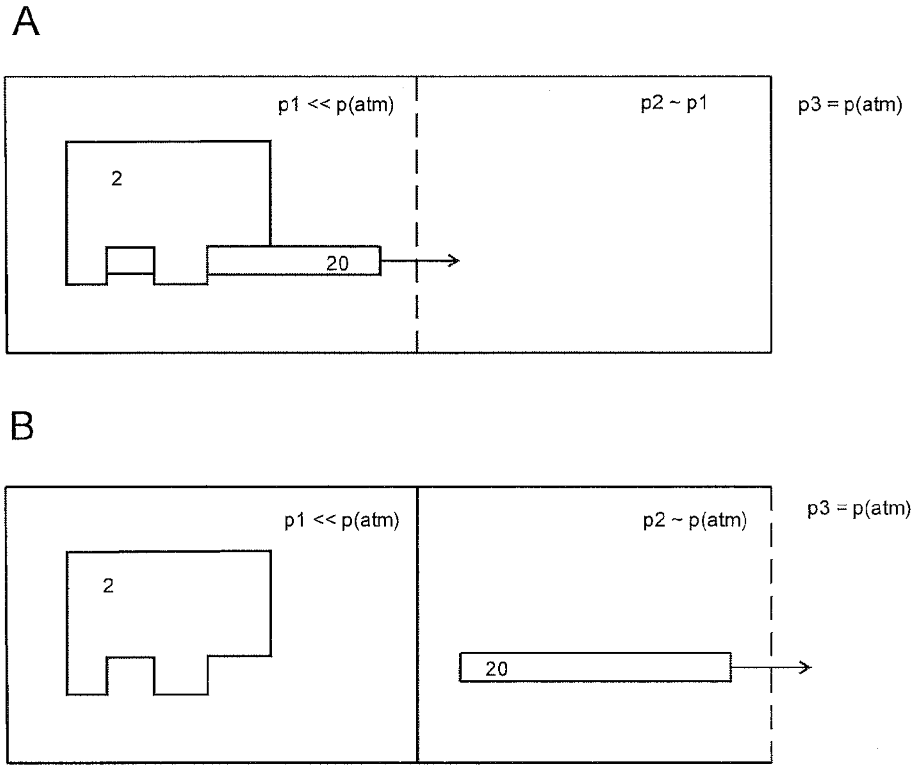
FIG. 11 illustrates an example of the locking out of the mount from a vacuum stage of a mass spectrometer without breaking the vacuum.

FIG. 11 is a schematic representation of how the mount 20 with ion-optical assembly attached to it (not shown) can be inserted into and withdrawn from the mass spectrometer, in which the corresponding receptacle is located, without breaking the vacuum. This example embodiment must not be seen as limiting. The removable ion-optical assembly can also be provided in designs of mass spectrometers which have no device for inserting and removing it without breaking the vacuum.

As indicated in the illustration, the receptacle 2 is located in a first chamber, which is maintained at a first pressure level p1 below atmospheric pressure p(atm) with the aid of a suitable pumping device. A lock chamber, in which the pressure level p2 is variable, is arranged adjacent to the first chamber. In this example, the pressure outside the two chambers described is to be atmospheric pressure p3=p(atm). In the top part A of the illustration, the mount 20 has been inserted into the receptacle 2, and is thus in an operating position of the mass spectrometer. In this state, ions on an ion path (in the illustration from the bottom to the top or vice versa, for example) can be transported through the open areas of the mount 20 and the receptacle 2 into further sections of the mass spectrometer.

The first chamber and the lock chamber are separated from each other by a lock gate, which can be opened and closed as required. The lock gate can take the form of a combined swinging/sliding door, for example. When the lock gate is open (broken line), the first chamber and the lock chamber form a joint large chamber with approximately the same pressure level. The path is now clear for the mount 20 to leave the receptacle 2 and be moved into the lock chamber. Since it is difficult to access evacuated chambers manually, the mount 20 is preferably moved by an automatic, computer-controlled transport unit (not shown) in conjunction with the control of the first lock gate. The transport unit may be configured to actuate the locking mechanism at the third pair of support elements. Once the mount 20 has reached its position in the lock chamber, the first lock gate can be closed again (solid line) so that the pressure regime in the first chamber and the lock chamber are separated from each other again. Now the lock chamber can be vented, which means that the pressure level p2 becomes equal to the external pressure level p3 (bottom illustration B). The mount 20 with the possibly contaminated ion-optical devices can be removed and cleaned.

Reinsertion essentially proceeds with the previously described steps in reverse order. After inserting the mount 20 into the lock chamber and closing the lock chamber, the pressure in the lock chamber p2 is lowered in order to equalize it to the pressure in the first chamber p1.

Figure 12:
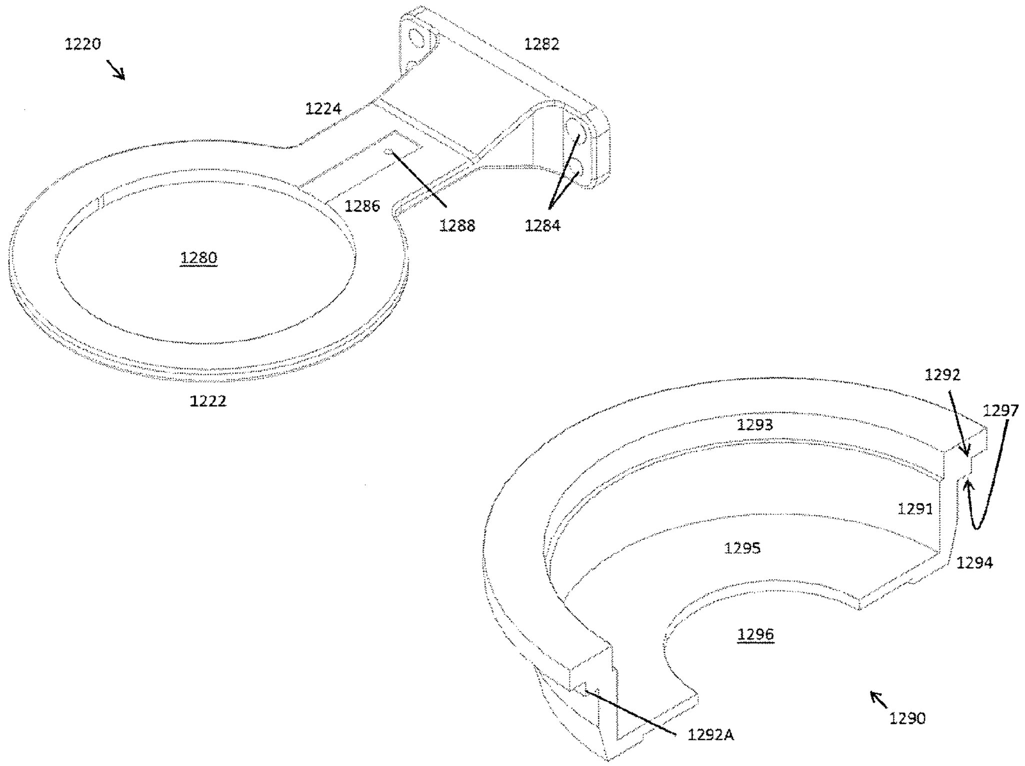
FIG. 12 illustrates a mount and an ion-optical assembly member according to aspect of the invention.

FIG. 12 shows another implementation of individual elements of an arrangement according to the second aspect of the invention. On the top left, a mount 1220 is presented that resembles the one shown in FIG. 2 in that it has a ring 1222 with a circular inner aperture 1280 and a flat (handle-like) member 1224 that radially protrudes therefrom. The flat member 1224 ends in a fixing extension 1282 having holes 1284, with which it can be attached to a support structure, such as a door in a vacuum housing wall (not illustrated). The mount 1220 further features a flat rectangular groove 1286 extending approximately radially from an inner rim of the circular aperture 1280 into a center portion of the flat member 1224. At a distal end, the flat groove 1286 may have a through-hole 1288 for attaching a sprung member, the function of which will become apparent from the description further below. Attachment may be effected by inserting a screw from one side of the through-hole 1288 and drawing tight a lock nut on the screw thread at the other side of the through-hole 1288, for instance.

On the bottom right, a cross section of a member 1290 of the ion-optical assembly is shown in an isometric view. Ion-optical devices such as electrodes (not shown) may be assembled together with the member 1290 to yield an ion-optical assembly. Additionally or alternatively, the ion-optical assembly member 1290 may also serve as an ion-optical device on its own. Here, the ion-optical assembly member 1290 has a generally annular cylindrical body 1291 with a doubly stepped outer flange portion 1292 and a recessed inner portion 1293 at one end of the cylindrical body 1291. The ion-optical assembly member 1290 depicted is rotationally symmetric; however, other asymmetric forms are also conceivable. The recessed radial inward portion 1293 may serve as support for other parts of the ion-optical assembly to be assembled with the body 1291, as will become apparent from the description further below. The other end of the cylindrical body 1291 shows a tapering body wall 1294 and further has a radially inward flange portion 1295 with an inner circular aperture 1296. The body 1291 of the ion-optical assembly member 1290 is intended to be inserted into the circular aperture 1280 of the mount 1220 so that a lower surface 1297 of the second step 1292A of the flange portion 1292 rests upon a rim around the circular aperture 1280. A rotationally symmetric design comes in handy at this point since no special alignment of the ion-optical assembly member 1290 toward the mount 1220 has to be observed. The (optional) tapering portion 1294 also serves to facilitate easy insertion of the ion-optical assembly member 1290 into the mount 1220. An outer diameter of the body wall 1294 is slightly undersized in relation to the inner diameter of the circular aperture 1280 of the mount 1220 so that the ion-optical assembly member 1290 can floatingly engage with mount 1220.

FIGS. 13A and 13B show an implementation of a receptacle 1302 according to principles of the invention in an isometric view (top left) and a straight axial view (bottom right). The receptacle 1302 generally has a circular cylindrical body 1306 with two front ends. The lower end 1304 visible in FIG. 13A shows an almost semi-circular axially protruding member or contact head 1310*c* with a flat lower surface, and opposite thereto at angles of approximately 130° (from center to center) two concave members 1310*a*, 1310*b*. The concave members 1310*a*, 1310*b* have the shape of a milling contour at a shoulder piece 1311 axially protruding from a certain angular section of the front end 1304 of the cylinder body 1306. This design allows simple manufacturing; however, it can be changed if considered practicable. For example, the concave members 1310*a*, 1310*b* can be provided at separate shoulder pieces which, in turn, themselves do not have to be integral with the cylinder body 1306 but can be attached thereto, for instance. In other embodiments, it can be useful to merge the two depicted concave members 1310*a*, 1310*b* into one which would then cover a certain minimum portion of the annular circumference at the front end 1304 of the cylindrical body 1306 as to provide stable contact surfaces for holding the ion-optical assembly member 1290, as will become clear from the description further below. In this example, the concave members 1310*a*, 1310*b* comprise circumferential grooves 1313 the entrance of which, in these embodiments, features beveled surfaces 1315. Beveled surfaces facilitate insertion of a complementary protruding portion of the ion-optical assembly member 1290. The grooves 1313 and the beveled surfaces 1315 may be the result of milling away a part of an initially rectangular shoulder piece 1311.

FIG. 14A shows a cross sectional view that shall be representative of the three afore-described elements. The cross section generally follows line Y-Y in FIG. 13B as far as the receptacle is concerned. However, by not keeping the scale and omitting many details the illustration has been partially simplified as to facilitate focusing on the relevant parts and steps. The ion-optical assembly member 1490 is inserted with its cylindrical body 1491 into the circular aperture 1480 of the mount 1420, and thus rests floatingly on the rim around the aperture 1480. A sprung member 1452, such as a curved leaf spring, is attached to the flat member (FIG. 12: 1224) of the mount 1420 by the through-hole (FIG. 12: 1288) and engages a space between an upper flange portion 1492B and a mount surface and forces the ion-optical assembly member 1490 against a radially inward facing contour of the circular aperture 1480 generally opposite the circumferential position of the sprung member 1452. Due to the undersize of the outer diameter of the ion-optical assembly member 1490 in relation to the inner diameter of the circular aperture 1480, there remains a gap 1417 between the ring and the cylindrical body 1491 at the side where the sprung member 1452 is located. In principle, in this position freedom to move for the ion-optical assembly member 1490 is possible but restricted in radial directions, unlimited in the upward axial direction, and not possible in the downward axial direction. It goes without saying that the leaf spring 1452 is shown by way of example only. Many other mechanisms of exerting pre-tension, such as actuators, are known to those skilled in the art and can be employed as the specific implementation desired requires and/or allows.

On the left, the simplified cross section of the receptacle 1402 shows parts of the cylindrical body 1406 featuring a concave member 1410*a* with groove 1413 and beveled surfaces 1415 at the entrance thereto. In the figure, two beveled surfaces are arranged on both sides of the groove entrance; however, at least the upper beveled surface may be dispensed with as will become apparent from the description further below. On the right, there can be seen parts of the cylindrical body 1406 as well as the contour of the protruding contact head 1410*c* in the background. Insertion of the ion-optical assembly member 1490 and the mount 1420 proceeds laterally in a direction approximately perpendicular to an axis 1419 of the receptacle 1402 (dash-dotted line). This axis 1419 may also be an axis of an ion path in the mass spectrometer (not shown) wherein the herein-described arrangement is employed.

Figure 14B:
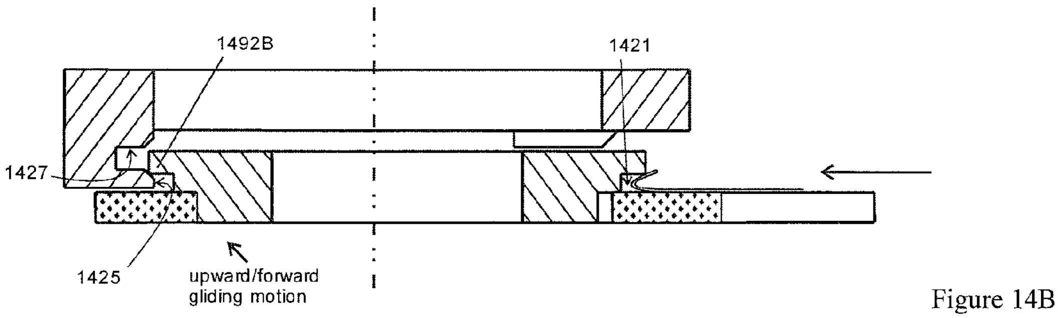

FIG. 14B now shows a point in time during the insertion at which an outer edge of the upper flange portion 1492B contacts the lower beveled surface 1415 at the entrance of the groove 1413 at the receptacle 1402. At this point, when proceeding with the lateral motion of insertion, the ion-optical assembly member 1490 starts to be disengaged from the mount 1420 in that it is lifted up by the upward gliding motion of the flange edge on the beveled surface 1415, whereas the mount 1420 remains roughly on the same height level. For facilitating the gliding motion, the edge of the flange shown rectangular here can be rounded in some design variants. Furthermore, the interacting surfaces can be treated as to further promote gliding. During the lifting of the ion-optical assembly member 1490, the space 1421 between the upper step of the flange 1492B and the mount surface, which accommodates the sprung member 1452, gradually increases so that it can more spaciously accommodate the leaf spring 1452 in this case. The force component exerted by the leaf spring 1452 in an axially upward direction then becomes more pronounced thereby assisting the lifting up at the side of the arrangement approximately opposite the concave member 1410*a*.

Figure 14C:
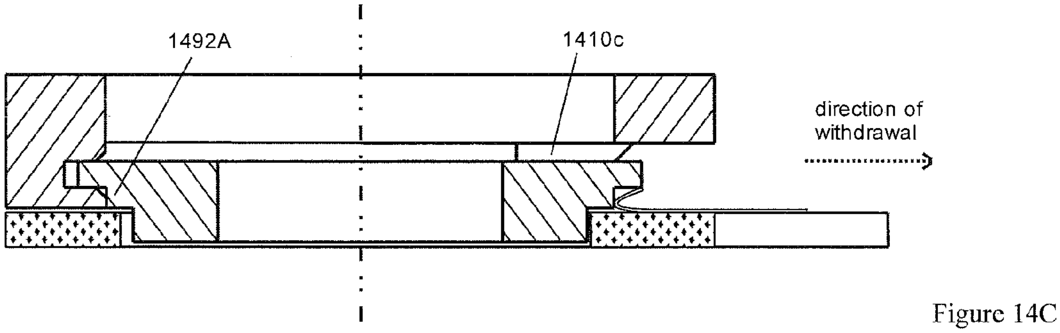

FIG. 14C now shows the end position of the ion-optical assembly member 1490 within the receptacle 1402. Therein, the upper flange portion 1492B engages with the groove 1413. A distance between upper and lower groove wall is preferably adapted to the thickness of the upper flange portion 1492B so that it snugly fits therein. In this manner, the ion-optical assembly member 1490 is well-aligned with the receptacle 1402 in the axial direction. In certain favorable embodiments, some contact surfaces at the groove 1413 can also mechanically support the ion-optical assembly member 1490. Under the pre-tension exerted by the leaf spring 1452, the lower flange portion 1492A, or second step of the flange, with a radially outward facing surface 1423 (see FIG. 14A) contacts a radially inward facing counter-surface 1425 (see FIG. 14B) of the receptacle 1402 below the beveled surface 1415 and thereby aligns the ion-optical assembly member 1490 with the receptacle 1402 in a radial direction. By virtue of the second concave member at the receptacle (FIGS. 13A and 13B: 1310*b*), which provides another contact surface for the lower flange portion 1492A, the ion-optical assembly member 1490 can be aligned with the receptacle 1402 in three spatial dimensions (a first radial direction; a second radial direction different from the first radial direction; and the axial direction). The leaf spring 1452 also forces an upper side of the ion-optical assembly member 1490 approximately opposite the concave member 1410*a* to contact the lower flat surface of the protruding contact head 1410*c*, which preferably is located at the same level as the upper groove wall 1427 (see FIG. 14B). In this position, the ion-optical assembly member 1490, and all elements not shown in these schematic illustrations that can be attached to it, such as accelerating electrodes, ground electrodes or screening electrodes in a MALDI ion source, for example, have a common axis with the receptacle 1402. The contact head 1410*c* is shown with a flat contact surface. However, in variants of the assembly shown, the contact head may also have a protruding element, such as a dome, which allows an almost punctiform or tangential contact with a counterpart at the ion-optical assembly member 1490. Preferably, a point of contact between the contact head 1410*c* and a counter-surface at the ion-optical assembly member 1290 may lie in the same plane as the upper wall of groove 1413. This plane can be perpendicular to axis 1419 as illustrated in FIG. 14A-14C.

It is to be understood from the foregoing description that alignment in three spatial dimensions is not strictly necessary for realizing embodiments according to principles of the invention. By omitting one of the concave members 1310*a* or 1310*b* shown in FIGS. 13A and 13B, for example, and by reducing the circumferential extension of the remaining one, basically an alignment in two spatial dimensions, and a certain freedom of motion in a third spatial dimension, can be achieved. Moreover, if no contact between radially outward facing surface at the lower flange portion 1492A and radially inward facing surface at the receptacle 1402 below the beveled surface 1415 is provided at a point of maximum insertion, alignment in only one spatial dimension, in this example in the axial direction owing to the snug fit of the upper flange portion 1492B within the groove 1413, can be provided. Thus, a rotational degree of freedom can be retained. Hence, it becomes apparent that certain modifications on the specific implementation presented here can easily be made without leaving the scope of the invention.

As can be seen from the gaps between the ion-optical assembly member 1490 and the mount 1420 in FIG. 14C, any physical contact between the two has been released so that alignment is effected solely by contact of the ion-optical assembly member 1490 with the receptacle 1402. This configuration allows decreasing the number of interfaces between the elements to be aligned to the minimum number of one thereby reducing the impact on positioning accuracy of any tolerances due to, for example, the mechanical tolerances during manufacturing or due to any response of the material to temperature changes.

Withdrawing the ion-optical assembly member 1490 from the receptacle 1402, such as for the purpose of inspection, maintenance and/or cleaning, can be achieved by just pulling out the mount 1420 in a lateral direction generally opposite the direction of insertion (see dotted arrow). Then, the inner rim contour of the mount ring 1422 contacts with the outer contour of the cylindrical body of the ion-optical assembly member 1490 below the lower flange portion 1492A, and the leaf spring 1452 is gradually disengaged from its position within the space between mount surface and upper flange portion 1492B. From that point on, the ion-optical assembly member 1490 is pulled out of the groove 1413, again gliding into the floating engagement position it had prior to insertion into the receptacle 1402 (see position in FIG. 14A).

Figure 15:
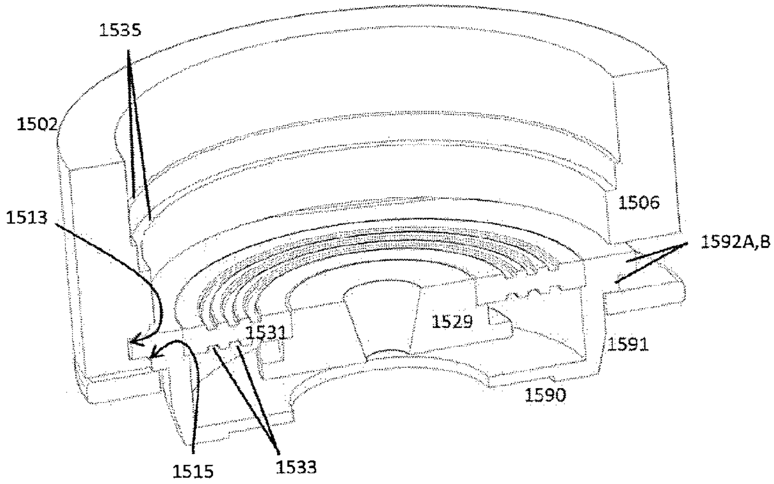
FIG. 15 illustrates an arrangement according to an aspect of the invention in a cross sectional isometric view wherein an ion-optical assembly is inserted into a receptacle with the aid of a mount.

FIG. 15 shows an arrangement according to principles of the invention in a final state of insertion in a cross sectional isometric view with slightly more details. A conductive central electrode 1529 is attached to the ion-optical assembly member 1590 via an electrically insulating annular member 1531 made, for instance, from a non-conductive plastic or ceramic. The insulator 1531 has several annular grooves 1533 in order to impede creeping currents, is supported at the recessed inner portion (FIG. 12: 1293) of the upper end of the cylindrical body 1591 of the ion-optical assembly member 1590 and fits flush therewith. Furthermore, also the receptacle 1502 shows some more structural features, such as two recessed steps 1535 in an upper portion of its cylindrical body 1506, which may serve as further support for other ion-optical elements, such as other electrodes, which are dispensed with in the illustration for the sake of clarity. As described above, in the end position, the upper flange portion 1592B engages with the groove 1513 at the receptacle 1502, and the lower flange portion 1592A contacts the inner circumference of the receptacle 1502 below the beveled surface 1515.

The invention is described above with the aid of the embodiments shown in the illustrations. Modifications of these embodiments are easily possible, however, and those skilled in the art can carry them out with knowledge of the inventive principle without leaving the scope of the present invention.

Although the present invention has been illustrated and described with respect to several preferred embodiments thereof, various changes, omissions and additions to the form and detail thereof, may be made therein, without departing from the spirit and scope of the invention.

What is claimed is:

1. An arrangement comprising a receptacle and a complementary mount for a removable ion-optical assembly in a mass spectrometer, where the mount and the receptacle have three pairs of complementary support elements, the three support elements on the receptacle form a support plane, and, when the mount is inserted into the receptacle, at least two pairs of support elements are engaged, and the mount can be aligned with respect to the support plane with the aid of the third pair of support elements.

2. The arrangement according to claim 1, wherein the mount can be rotated within a predetermined angular range about an axis which runs through the two pairs of support elements which are engaged with each other.

3. The arrangement according to claim 2, wherein the predetermined angular range is co-determined by the orthogonal separation between the axis and the third pair of support elements.

4. The arrangement according to claim 1, wherein two of the support elements on the receptacle are recessed, and the complementary support elements on the mount have a bulged configuration.

5. The arrangement according to claim 1, further comprising a disengaging and re-engaging locking mechanism at the third pair of support elements.

6. The arrangement according to claim 5, wherein the third pair of support elements has a tapered contact head on the receptacle and a pre-tensioned catch attached to the mount.

7. The arrangement according to claim 5, wherein the third pair of support elements has a partially recessed sphere on one end of the receptacle and a counter-surface on the mount, and adjacent to this a tapered contact head on the receptacle and a pre-tensioned catch on the mount is provided as the locking mechanism.

8. The arrangement according to claim 1, wherein the mount has a ring with a radially projecting handle.

9. The arrangement according to claim 8, wherein the dimensions of the ring are generally matched to the dimensions of the cylinder.

10. A mass spectrometer with an arrangement comprising a receptacle and a complementary mount for a removable ion-optical assembly in a mass spectrometer, where the mount and the receptacle have three pairs of complementary support elements; the three support elements on the receptacle form a support plane, and, when the mount is inserted into the receptacle, at least two pairs of support elements are engaged, and the mount can be aligned with respect to the support plane with the aid of the third pair of support elements.

11. The mass spectrometer according to claim 10, further comprising a lock for introducing and extracting the mount without breaking the vacuum.

12. The mass spectrometer according to claim 10, further comprising sprung contact pins which are supported on the receptacle and which touch appropriate counter-contacts on the mount in order to produce an electrical connection when the mount is introduced into the receptacle.

13. The mass spectrometer according to claim 10, further comprising an ion path in the mass spectrometer, wherein the mount can be removed and reinserted in a plane approximately perpendicular to the ion path.

14. An arrangement for a mass spectrometer, comprising:

a receptacle, a mount, and an ion-optical assembly member, the mount and the ion-optical assembly member being configured such that the ion-optical assembly member can floatingly engage with the mount;

wherein the receptacle, the mount, and the ion-optical assembly member are configured such that, upon insertion of the ion-optical assembly member into the receptacle with the aid of the mount, the ion-optical assembly member becomes at least partially disengaged from the mount and aligned towards the receptacle in at least one dimension.

15. The arrangement of claim 14, wherein partial disengagement comprises releasing direct physical contact and maintaining pre-tension contact through one of a sprung member interposed between the mount and the ion-optical assembly member and an actuator.

16. The arrangement of claim 14, wherein the mount has an inner aperture, and the ion-optical assembly member comprises a body which is slightly undersized to fit into the inner aperture as well as a flange portion protruding from the body as to contact a rim region of the inner aperture.

17. The arrangement of claim 16, wherein the flange portion is doubly stepped as to provide alignment surfaces for contacting corresponding counter-surfaces at the receptacle.

18. The arrangement of claim 17, wherein the counter-surfaces are provided at a groove portion of the receptacle.

19. The arrangement of claim 18, wherein the groove portion has a beveled entrance.

20. The arrangement of claim 14, wherein a direction of insertion and withdrawal is approximately perpendicular to an axis of the receptacle.

* * * * *

UNITED STATES PATENT AND TRADEMARK OFFICE

CERTIFICATE OF CORRECTION

PATENT NO. : 8,642,945 B2
APPLICATION NO. : 13/567213
DATED : February 4, 2014
INVENTOR(S) : Kern et al.

It is certified that error appears in the above-identified patent and that said Letters Patent is hereby corrected as shown below:

In the Specification

Column 8
Line 4, please delete “10e” and insert --10c--

Column 10
Line 5, please delete “faun” and insert --form--

Signed and Sealed this
Twentieth Day of May, 2014

Michelle K. Lee
*Deputy Director of the United States Patent and Trademark Office*